(12) United States Patent
Choi et al.

(10) Patent No.: US 7,251,472 B2
(45) Date of Patent: Jul. 31, 2007

(54) COMMUNICATION METHOD AND SYSTEM FOR SELECTING PUBLIC LAND MOBILE NETWORK

(75) Inventors: Kwang-Hae Choi, Seoul (KR); Yang-Sun Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 188 days.

(21) Appl. No.: 10/766,725

(22) Filed: Jan. 27, 2004

(65) Prior Publication Data
US 2004/0192254 A1    Sep. 30, 2004

(30) Foreign Application Priority Data
Jan. 29, 2003    (KR)    ............. 10-2003-0006011

(51) Int. Cl.
*H04M 1/66*    (2006.01)
(52) U.S. Cl. ............. 455/411; 455/434; 455/432.1
(58) Field of Classification Search ........... 455/411, 455/434, 432.1, 419, 433, 432, 435.1
See application file for complete search history.

(56) References Cited

U.S. PATENT DOCUMENTS

| | | | | |
|---|---|---|---|---|
| 6,141,544 A * | 10/2000 | Corriveau et al. | ......... | 455/411 |
| 6,282,419 B1 * | 8/2001 | Findikli | ......... | 455/434 |
| 6,324,399 B1 * | 11/2001 | Salmivalli | ......... | 455/433 |
| 6,415,148 B1 * | 7/2002 | Chiniga et al. | ......... | 455/434 |
| 6,584,311 B1 * | 6/2003 | Sorenson et al. | ......... | 455/432.1 |
| 6,625,451 B1 * | 9/2003 | La Medica et al. | ......... | 455/434 |
| 2002/0072359 A1 * | 6/2002 | Moles et al. | ......... | 455/425 |
| 2002/0094808 A1 * | 7/2002 | Tiedemann et al. | ......... | 455/419 |
| 2002/0168976 A1 * | 11/2002 | Krishnan | ......... | 455/432 |

(Continued)

FOREIGN PATENT DOCUMENTS
EP    1 045 608    10/2000

(Continued)

OTHER PUBLICATIONS

ETS 300 507, Digital Cellular Telecommunications System (Phase 2); Service Accessibility (GSM 02.11), 4th Edition, Sep. 1996.

*Primary Examiner*—Duc M. Nguyen
*Assistant Examiner*—Chuck Huynh
(74) *Attorney, Agent, or Firm*—The Farrell Law Firm

(57) ABSTRACT

Disclosed is a communication system for selecting a PLMN (Public Land Mobile Network). In the communication system, an MS (Mobile Station) transmits an MIN (Mobile Identification Number) message, an ESN (Electronic Serial Number) message and a location update request signal containing location information such that the MS's location can be registered, and searches for the PLMN on the basis of an HPLMN search period value corresponding to the location update request signal. An MSC (Mobile Switching Center) performs an authentication procedure for the MS transmitting the location update request signal, and extracts the location information from the location update request signal. A VLR (Visitor Location Register) stores subscriber data of the MS provided from outside the MS and registers a location of the MS. An HLR (Home Location Register) updates the location information of the MS extracted from the MSC, variably sets a search period value at a time of searching for an HPLMN or higher-priority PLMN on the basis of the location information of the MS, and transmits the set search period value to the MS.

16 Claims, 3 Drawing Sheets

U.S. PATENT DOCUMENTS

2003/0134637 A1* 7/2003 Cooper ............................ 455/432
2004/0076130 A1* 4/2004 Uchida et al. .................. 370/335
2004/0087305 A1* 5/2004 Jiang et al. ................... 455/432.1
2004/0110503 A1* 6/2004 Park ............................. 455/435.1

FOREIGN PATENT DOCUMENTS

WO    WO 01/17125      *  3/2001
WO    WO 0117125 A1   *  3/2001

* cited by examiner

COMMUNICATION METHOD AND SYSTEM FOR SELECTING PUBLIC LAND MOBILE NETWORK

This application claims priority to an application entitled "COMMUNICATION METHOD AND SYSTEM FOR SELECTING PUBLIC LAND MOBILE NETWORK", filed in the Korean Industrial Property Office on Jan. 29, 2003 and assigned Serial No. 2003-06011, the contents of which are hereby incorporated by reference.

BACKGROUND OF THE INVENTION

1. Field of the Invention

The present invention relates to a communication system and method for selecting an HPLMN (Home Public Land Mobile Network), and more particularly to a communication system and method capable of reducing power consumption when an MS (Mobile Station) searches for an HPLMN or higher-priority PLMN.

2. Description of the Related Art

Roaming is defined as a function of enabling an MS (Mobile Station) to receive a service outside of a predetermined area and to receive a service anywhere within a country as a single area. A PLMN (Public Land Mobile Network) is a public telecommunication network including the MS using telephony services from mobile communication carriers through the MS's roaming function, a BTS (Base Transceiver Subsystem), a subscriber location register and an MSC (Mobile Switching Center). An HPLMN (Home PLMN) is a PLMN used at a time when the MS selects another PLMN to receive a service from a corresponding service carrier.

In a second or third generation mobile communication service suggested by ETSI (European Telecommunications Standards Institute) or 3GPP (Third Generation Partnership Project), an MS is recommended to search for an HPLMN according to a set time period where the MS receives the service from a VPLMN (Visitor PLMN) rather than the HPLMN. Thus, the MS searches for the HPLMN using priority information when the MS selects the PLMN in an automatic mode or manual mode on the basis of the set time period stored in an SIM (Subscriber Identity Module).

However, where the MS receiving a service from the VPLMN automatically searches for a PLMN in the automatic mode, the MS located in the VPLMN must search for a higher-priority PLMN than an HPLMN or current PLMN on the basis of a set time period stored in the SIM irrespective of service conditions at a current location. That is, the MS located in the VPLMN must perform an operation of searching for another PLMN every "T" minutes. At this time, "T" as a value of a period used when the MS searches for the PLMN is a value arbitrarily set and fixed without considering service situations of the PLMN in which the MS is located.

Conventionally, the MS is in synchronization with a frequency not being monitored other than a currently monitored frequency in order to search for the PLMN. At this time, the MS detects system information contained in a synchronous frequency signal after the frequency synchronization and detects the PLMN's ID from the detected system information. While performing the above-described procedure, the MS consumes additional power. Moreover, where the MS does not utilize the service situations in the PLMN in which it is located and the set "T" value is smaller than an arbitrary reference value, the MS frequently performs a search operation for the PLMN on the basis of the set "T" value. Accordingly, there is a problem in that an available time of a charged battery for supplying the MS with power is greatly reduced.

Where the MS moves to an HPLMN or higher-priority PLMN during a search procedure for the PLMN, the power of the charged battery is consumed, but there is an advantage in that the MS can select a desired PLMN. However, where the MS is not located in the HPLMN or higher-priority PLMN, there are other problems in that the MS consumes unnecessary power and hence an available time of a charged battery is reduced.

SUMMARY OF THE INVENTION

Therefore, it is an object of the present invention to provide a method for selecting a PLMN (Public Land Mobile Network) in an MS (Mobile Station) capable of reducing power consumption when the MS searches for an HPLMN (Home PLMN) and a higher-priority PLMN so as to perform a roaming function on the basis of a set time period irrespective of service situations in a current location of the MS.

It is another object of the present invention to provide a method for selecting a PLMN (Public Land Mobile Network) in an MS (Mobile Station) capable of enabling the MS to efficiently search for an HPLMN (Home PLMN) and a PLMN with considering service situations in a current location of the MS upon performing a roaming function.

In accordance with one aspect of the present invention, the above and other objects can be accomplished by the provision of a communication system for selecting a PLMN (Public Land Mobile Network), comprising: an MS (Mobile Station) for transmitting an MIN (Mobile Identification Number) message, an ESN (Electronic Serial Number) message and a location update request signal containing location information for registering the location of the MS and for searching for the PLMN on the basis of an HPLMN search period value corresponding to the location update request signal; an MSC (Mobile Switching Center) for performing an authentication procedure for the MS transmitting the location update request signal and extracting the location information from the location update request signal; a VLR (Visitor Location Register) for storing subscriber data of the MS provided from outside the MS and registering a location of the MS; and an HLR (Home Location Register) for updating the location information of the MS extracted from the MSC, variably setting a search period value at a time of searching for an HPLMN or higher-priority PLMN on the basis of the location information of the MS and transmitting the set search period value to the MS.

Preferably, the HLR may set the search period value to a value larger than a set threshold value if the HLR determines that the HPLMN and PLMN do not exist in a predetermined range, on the basis of the location information. Preferably, the HLR may set the search period value to a value smaller than the set threshold value if the HLR determines that at least one of the HPLMN and PLMN exists in a predetermined range, on the basis of the location information. Alternatively, the HLR may set the search period value to "0" if the HLR determines that the HPLMN and PLMN do not exist in a predetermined range, on the basis of the location information to stop the search operation. Preferably, the HLR may newly set the search period value when newly receiving the location information.

In accordance with another aspect of the present invention, there is provided a method for selecting a PLMN (Public Land Mobile Network) in an MS (Mobile Station)

using a communication system, the communication system including the MS, an MSC (Mobile Switching Center), a VLR (Visitor Location Register) and an HLR (Home Location Register), comprising the steps of: a) transmitting subscriber identification information and authentication information for authenticating the MS according to a location update request signal containing location information of the MS received from the MS; b) if the location information is received from the MSC through an authentication procedure by the MSC, updating the location information and allowing the MS to request a previous VLR of the MS to release previously registered location information; c) if the location information previously registered by the previous VLR is released, inserting subscriber data for the MS into the VLR; and d) variably setting a search period value at a time of searching for an HPLMN or higher-priority PLMN on the basis of the location information of the MS and transmitting the set search period value to the MS.

Preferably, step d) may comprise the steps of: setting the search period value to a value larger than a set threshold value if it is determined that the HPLMN and PLMN do not exist in a predetermined range, on the basis of the location information; and setting the search period value to a value smaller than a set threshold value if it is determined that at least one of the HPLMN and PLMN exists in a predetermined range, on the basis of the location information. Alternatively, step d) may also comprise the step of: setting the search period value to "0" if it is determined that the HPLMN and PLMN do not exist in a predetermined range, on the basis of the location information, to stop the search operation. Preferably, step d) may also comprise the step of: newly setting the search period value when the location information is newly received.

Preferably, the location information may be geographic information on a map. Preferably, the location information may comprise latitude information and longitude information associated with the location of the MS. Preferably, the subscriber data may be information associated with corresponding service subscription using the MS. Preferably, the step d) may, comprise the step of: transmitting the period value to the MS using an OTA (Over The Air) method.

In accordance with the present invention, an HLR variably sets a value of an HPLMN rescan timer indicating a period for searching for an HPLMN on the basis of geographic information of an MS received from the MS during the MS's location update procedure, and then transmits the, set value to the MS, thereby more efficiently searching for the HPLMN on the basis of the set value of the HPLMN rescan timer. Further, where the MS is located in a service environment in which an operation of searching for an HPLMN or higher-priority PLMN does not have to be performed according to the location information from the MS, the HLR sets the HPLMN rescan timer such that it does not operate, thereby reducing unnecessary power consumption at a time when the MS searches for the HPLMN or higher-priority PLMN.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
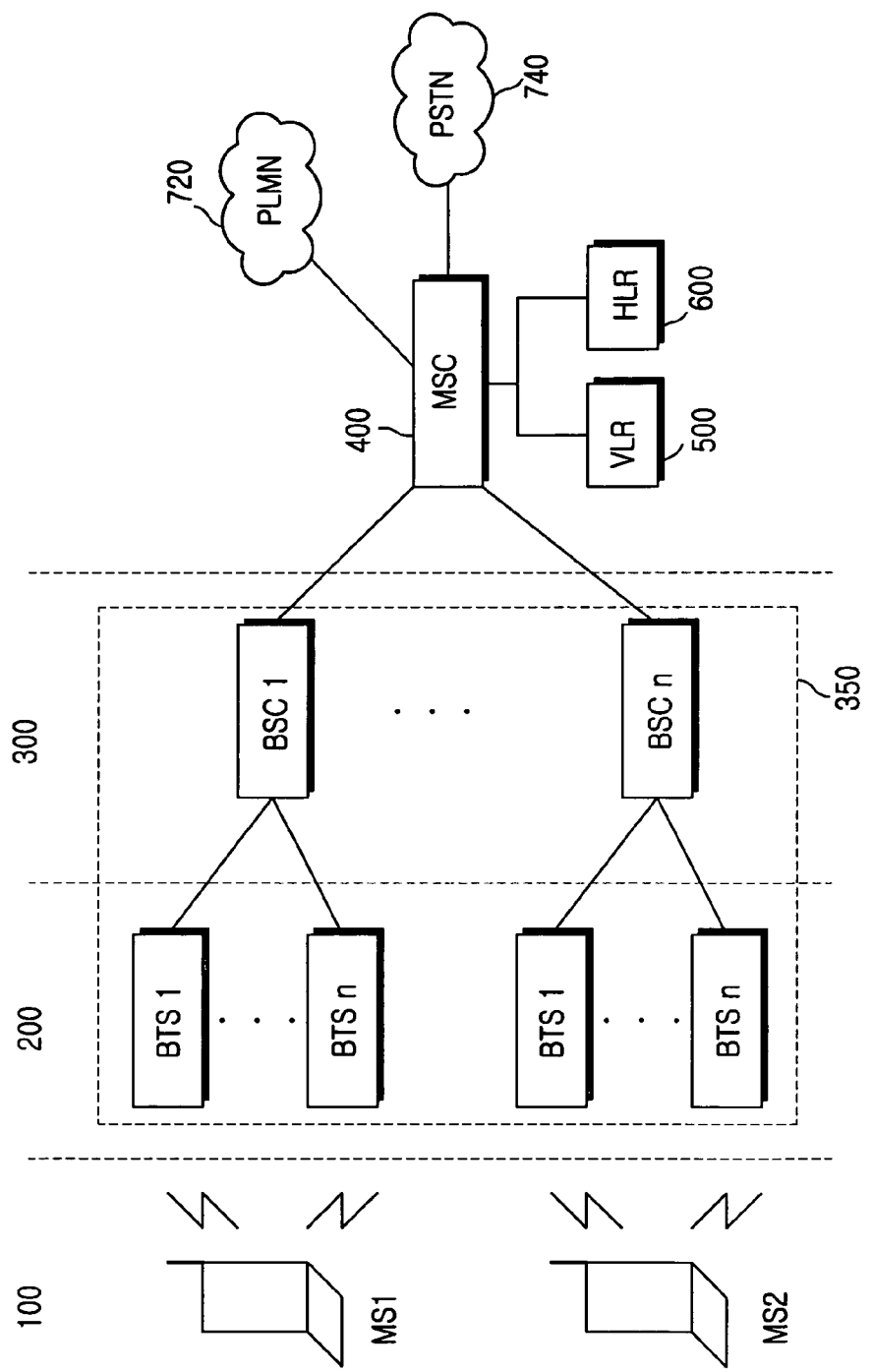
FIG. 1 is an overview illustrating a configuration of a mobile communication system for performing corresponding functions in accordance with an embodiment of the present invention.

Now, preferred embodiments of the present invention will be described in detail with reference to the annexed drawings. In the drawings, the same or similar elements are denoted by the same reference numerals even though they are depicted in different drawings. In the following description given in conjunction with preferred embodiments of the present invention, a variety of specific elements are shown. The description of such elements has been given only for a better understanding of the present invention. Those skilled in the art will appreciate that the present invention can be implemented without using the above-mentioned specific elements. Also, in the following description, a detailed description of known functions and configurations incorporated herein will be omitted when it may make the subject matter of the present invention unclear.

FIG. 1 is an overview illustrating a configuration of a mobile communication system for performing corresponding functions in accordance with an embodiment of the present invention.

Referring to FIG. 1, the mobile communication system includes BTSs (Base Transceiver Subsystems) 200, BSCs (base station controllers) 300, a switching center, i. e. , an MSC (Mobile Switching Center) 400, an HLR (Home Location Register) 600 and a VLR (Visitor Location Register) 500.

The mobile communication system is connected to an MS (Mobile Station) 100 by an air interface and performs a function of accessing a PLMN (Home Public Land Mobile Network) 720 and a PSTN (Public Switched Telephone Network) 740.

A BTS 200 configures a radio communication path with the MS 100 and manages radio resources, wherein the BTS 200 is referred to as a cell site. A radio signal from the BTS 200 covers only a specific area. Several hundred BTSs can exist in a corresponding service area.

The BSC 300 performs a wireless link control function, a wired link control function and a hand-off function. Here, the BTSs 200 and the BSCs 300 are included in a BSS (Base Station System) 350.

The MSC 400 sets up a call path and performs a number translation function. The MSC 400 directs a hand-off when the MS 100 moves to a new cell. Moreover, the MSC 400 provides a matching function for the PSTN 740. A plurality of MSCs can exist in a service area.

The VLR 500 is a database for an MS 100 located outside of a home switching center, i.e., a visitor MS 100. The VLR 500 temporarily stores subscriber information in the MSC 400 that the MS 100 visits, such that a service can be provided to the MS 100. When the MS 100 is outside of a service area, the VLR 500 deletes information of the visitor MS 100.

The HLR 600 keeps a roaming number of the MS 100 as a database, which permanently keeps information of the MS 100 for a mobile communication service. Moreover, the HLR 600 performs a function of registering a location of the MS 100, and keeps information necessary for controlling a service to the MS 100. At this time, the information necessary for controlling the service to the MS 100 includes, for example, identification information of the MS 100, i.e., the subscriber number, numbering plan information, subscriber operation information, authentication information, supplementary service information, charging information, etc. The HLR 600, in the form of software, can be implemented either inside or outside the MSC 400.

A roaming operation of the MS 100 will be briefly described with reference to FIG. 1. First, if a power supply of the MS 100 is turned on, the MS 100 transmits, to the BSS 350, a request signal for registering a location of the MS 100 along with an MIN (Mobile Identification Number or Phone Number) message and an ESN (Electronic Serial Number) message. The BSS 350 transmits the MIN message and the ESN message to the MSC 400.

The MSC 400 compares the MIN message received from the BSS 350 with all MIN messages contained within a network. The MSC 400 performs an authentication procedure to determine whether an MS 100 is an MS associated with a home switching center or a visitor MS. At this time, the MSC 400 requests the HLR 600 to provide a profile of the MS 100.

If the MSC 400 determines, through the profile of the MS 100 provided from the HLR 600, that the MS 100 is a visitor MS, i.e., a visiting subscriber, the MSC 400 transmits the MIN message and the ESN message to the HLR 600 to which the visitor MS 100 belongs, using routing information stored in an STP (Signalling Transfer Point) through a signalling network.

The HLR associated with a home switching center of the visitor MS 100 which receives the MIN message and the ESN message, checks the validity of corresponding numbers contained in the MIN and ESN messages. Moreover, the HLR associated with the home switching center of the visitor MS 100 stores location information of the MS 100 and transmits the profile of the MS 100 to a visited switching center, i.e., the MSC 400.

The MSC 400 receiving the profile of the MS 100 from the HLR associated with the home switching center of the visitor MS 100, stores the received location information relating to the MS 100 in the VLR 500.

Accordingly, where the MS 100 is associated with the visited switching center, it can receive a communication service without going through its home switching center.

In this embodiment, the MSC 400 provides, to the HLR 600, the received MIN and ESN messages for subscriber authentication along with the location information. The HLR 600 variably sets an HPLMN rescan timer allocated to the MS 100 on the basis of the location information of the MS 100. The location information of the MS 100 is geographic location information on a map. For example, the geographic location information includes the latitude and longitude, etc. of a cell in which the MS 100 is located. The HLR 600 transmits, to the MSC 400, HPLMN rescan timer information set on the basis of the location information of the MS 100. The MSC 400 transmits the HPLMN rescan timer information to the MS 100 using an OTA (Over The Air) method.

Accordingly, the MS 100 performs an operation of searching for an HPLMN every period by the HPLMN rescan timer information set in the HLR 600 on the basis of the location information of the MS 100. Because the MS 100 performs an operation of searching for an HPLMN every period by the HPLMN rescan timer information, the power consumption of the MS 100 can be reduced.

Figure 2:
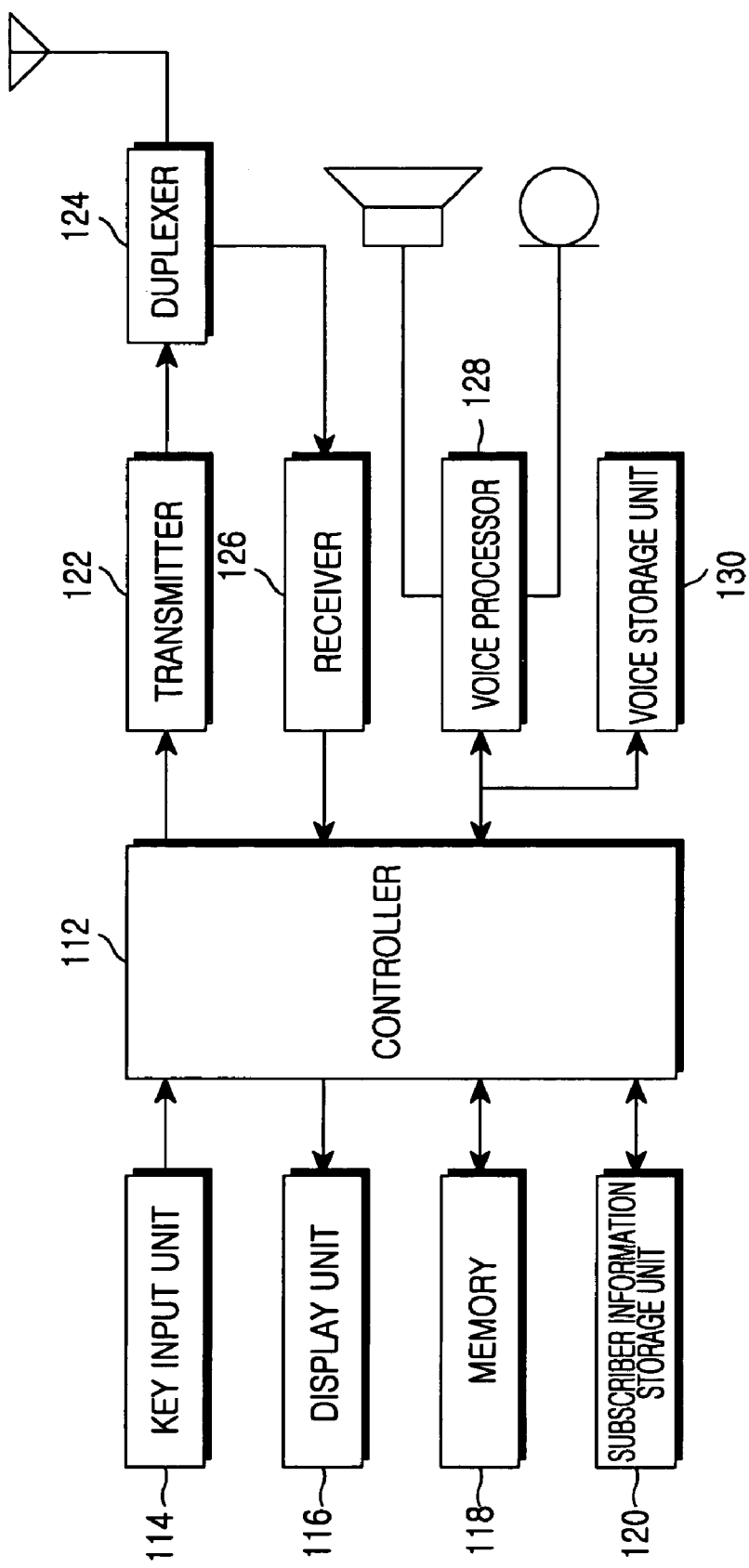
FIG. 2 is a block diagram illustrating a detailed configuration of an MS 100 shown in FIG. 1.

FIG. 2 is a block diagram illustrating a detailed configuration of an MS 100 shown in FIG. 1. The MS 100 includes a controller 112, a key input unit 114, a display unit 116, a memory 118, a subscriber information storage unit 120, a transmitter 122, a receiver 126, a duplexer 124, a voice processor 128 and a voice storage unit 130.

The controller 112 controls an overall operation of the MS 100. The key input unit 114 includes a plurality of digit keys, a menu key, a transmission key, etc. When a key signal corresponding to a key selected by a user is generated, the key input unit 114 transfers the key signal to the controller 112. The display unit 116 is implemented by an LCD (Liquid Crystal Display), an LED, etc. Under the control of controller 112, the display unit 116 displays control data and input data of the MS 100.

The memory 118 stores a control program of the MS 100 and control data generated according to the control of the controller 112. The subscriber information storage unit 120 is preferably an SIM (Subscriber Information Module) card used in GSM (Global System for Mobile) and stores information of the MS 100.

The transmitter 122 receives a signal generated from the controller 112, performs digital radio modulation for the received signal and transfers a digital radio modulation signal to the duplexer 124. The duplexer 124 transmits a radio signal from the transmitter 122 through an antenna. The receiver 126 demodulates a radio signal received through the antenna and transferred from the duplexer 124, and transfers the demodulated signal to the controller 112. The controller 112 controls the communication of the MS 100 in response to the demodulated signal from the receiver 126.

The voice storage unit 130 stores a plurality of voice messages. The voice processor 128 processes a voice message read from the voice storage unit 130 in an analog form under the control of the controller 112 and then transmits the processed voice message. An analog voice signal inputted from the user through a microphone is processed in a digital signal form.

Figure 3:
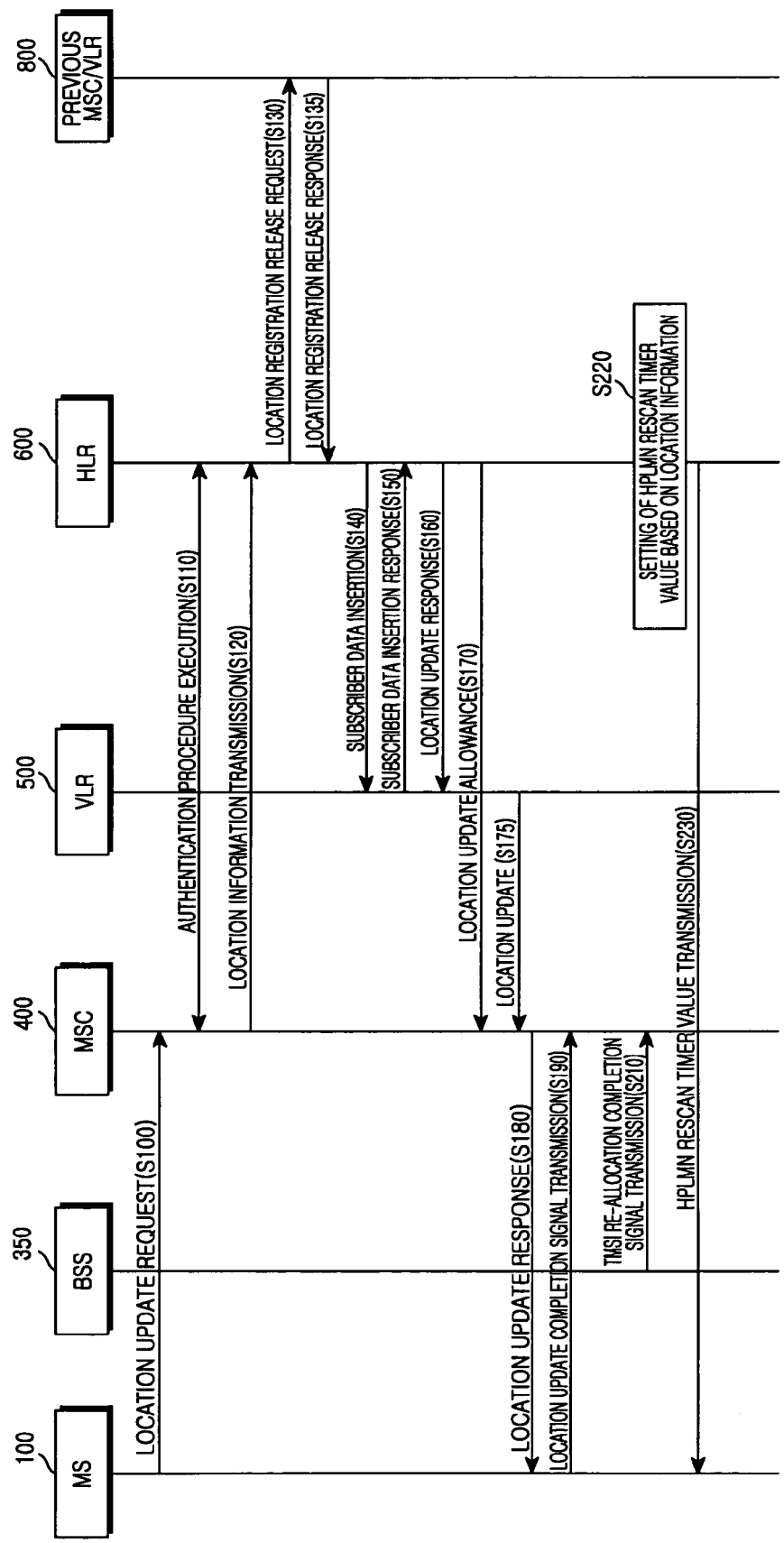
FIG. 3 illustrates a method for selecting a PLMN (Public Land Mobile Network) using a mobile communication system in accordance with a preferred embodiment of the present invention.

FIG. 3 illustrates a method for selecting a PLMN using the mobile communication system in accordance with a preferred embodiment of the present invention. As shown in FIG. 3, the MS 100 transmits a location update request signal containing MIN and ESN messages to the MSC 400 through the BSS 350 (S100). In response to the location update request signal containing the MIN and ESN messages, the MSC 400 performs an authentication procedure for the MS 100 on the basis of subscriber authentication information stored in the HLR 600 (S110). When performing the authentication procedure for the MS 100, the MSC 400 determines whether the MS 100 is a home subscriber or a visiting subscriber.

If the authentication procedure for the MS 100 has been completed, the MSC 400 transmits, to the HLR 600, geographic location information on a map in relation to the MS 100 such that the geographic location information of the MS 100 can be updated (S120). When the geographic location information is received from the MSC 400, the HLR 600 transmits a release request signal for releasing the registration of a previous location of the MS 100 to a previous MSC/VLR 800, which provides a service to the MS 100 at the previous location before the MS 100 moves to a service network covered by the MSC 400 (S130). If the previous MSC/VLR 800 receives the location registration release request signal, it transmits a location registration release response signal to the HLR 600 after the location information of the MS 100 registered in the VLR is deleted (S135).

If the HLR 600 receives the location registration release response signal, it inserts stored subscriber data relating to the MS 100 into the VLR 500 (S 140). Here, the subscriber data includes subscription information relating to service provisions, identification, authentication, routing, call handling, GPRS (General Packet Radio Services) mode transmission, charging, subscriber tracing, operation and maintenance. The subscriber data is classified into permanent subscriber data capable of being changed by a manager and temporary subscriber data capable of being changed by normal operation of a system. The VLR 500 stores the received subscriber data relating to the MS 100 and then transmits a subscriber data insertion response signal to the HLR 600 (S150).

If the HLR 600 receives the subscriber data insertion response signal, it updates the geographic location information of the MS 100 received at the above step S120 and transmits, to the VLR 500, a location update response signal relating to the MS 100 (S160). Further, the HLR 600 transmits, to the MSC 400, a signal for allowing the location information of the MS 100 to be updated, i.e., a location update allowance signal (S170).

If the MSC 400 receives the location update allowance signal, it updates the location information of the MS 100 received at the above step S160 in the VLR 500 (S175). If the location information of the MS 100 is updated in the VLR 500, the MSC 400 transmits a location update response signal to the MS 100 through the BSS 350 (S180). If the MS 100 receives the location update response signal, it transmits a location update completion signal to the MSC 400 through the BSS 350, wherein the location update completion signal indicates that the response signal to the location update request signal contained at the above step S100 has been successfully received (S190). At this time, the BSS 350 re-allocates, to the MS 100, TMSI (Temporary Mobile Station Identity) necessary for providing a service to a new visiting subscriber and then transmits a TMSI re-allocation completion signal to the MSC 400 (S210).

If the geographic location information of the MS 100 is updated, the HLR 600 variably sets a value of the HPLMN rescan timer on the basis of the updated geographic location information (S220). Preferably, when the HLR 600 produces the value of the HPLMN rescan timer, it increments the value of the HPLMN rescan timer and sets a time period for searching for an HPLMN to a value larger than a threshold value on the basis of the location information, where an HPLMN or a PLMN corresponding to the HPLMN does not exist within a predetermined geographic range from a location of the MS 100. Alternatively, where the HPLMN or the PLMN corresponding to the HPLMN does not exist within the predetermined geographic range from a location of the MS 100, the HLR 600 sets the value of the HPLMN rescan timer, i.e., the time period for searching for the HPLMN to "0" on the basis of the location information such that the MS 100 stops an operation of searching for the HPLMN. Then, if the location information of the MS 100 is changed in response to a new location update request signal, the HLR 600 adjusts the value of the HPLMN rescan timer such that the MS 100 can appropriately search for the HPLMN.

On the other hand, where the HPLMN or the PLMN corresponding to the HPLMN exists within the predetermined geographic range from a location of the MS 100 based on the location information, the HLR 600 sets a time period for searching for an HPLMN to a value smaller than a set threshold value such that the MS 100 can often perform an operation of searching for the HPLMN.

Accordingly, where the HPLMN or the PLMN corresponding to the HPLMN does not exist within the predetermined geographic range, the MS 100 performs an operation of searching for the HPLMN on the basis of the set value of the HPLMN rescan timer, thereby reducing the power consumption of a battery for performing the HPLMN search operation. If the HPLMN must be frequently searched for according to the location of the MS 100, a time period for searching for an HPLMN is set to a value smaller than a set threshold value such that the MS 100 can often perform an operation of searching for the HPLMN, thereby making communications more stable.

The HLR 600 transmits the set value of the HPLMN rescan timer to the MS 100 (S230). Preferably, when the HLR 600 transmits the value of the HPLMN rescan timer to the MS 100, it informs the MS 100 of the set value using an OTA (Over The Air) method.

Accordingly, the MS 100 performs an operation of searching for the HPLMN on the basis of the time period set according to the value of the HPLMN rescan timer received from the HLR 600.

In accordance with the present invention, an HLR variably sets a value of an HPLMN rescan timer indicating a time period for searching for an HPLMN on the basis of geographic location information of an MS received from the MS in an MS's location update procedure, and then transmits the set value to the MS, thereby more efficiently searching for the HPLMN on the basis of the set value of the HPLMN rescan timer.

Further, where the MS is located in a service environment in which an operation of searching for an HPLMN or higher-priority PLMN does not have to be performed according to the location information from the MS, the HLR sets the HPLMN rescan timer such that it does not operate, thereby reducing unnecessary power consumption at a time when the MS searches for the HPLMN or higher-priority PLMN.

Although the preferred embodiments of the present invention have been disclosed for illustrative purposes, those skilled in the art will appreciate that various modifications, additions and substitutions are possible, without departing from the scope of the invention. Accordingly, the present invention is not limited to the above-described embodiments, but the present invention is defined by the claims which follow, along with their full scope of equivalents.

What is claimed is:

1. A communication system for selecting a PLMN (Public Land Mobile Network), comprising:
    an MS (Mobile Station) for transmitting an MIN (Mobile Identification Number) message, an ESN (Electronic Serial Number) message and a location update request signal containing location information for registering the location of the MS and for searching for the PLMN on the basis of an HPLMN search period value corresponding to the location update request signal;
    an MSC (Mobile Switching Center) for performing an authentication procedure for the MS transmitting the location update request signal and extracting the location information from the location update request signal;
    a VLR (Visitor Location Register) for storing subscriber data of the MS provided from outside the MS and registering a location of the MS; and
    an HLR (Home Location Register) for updating the location information of the MS extracted from the MSC, variably setting a search period value for determining a time at which to begin a search at a time of searching for an HPLMN or higher-priority PLMN on the basis of the location information of the MS and transmitting the set search period value to the MS.

2. The communication system as set forth in claim 1, wherein the HLR sets the search period value to a value larger than a set threshold value if the HLR determines that the HPLMN and PLMN do not exist in a predetermined range, on the basis of the location information; and
wherein the HLR sets the search period value to a value smaller than a set threshold value if the HLR determines that at least one of the HPLMN and PLMN exists in a predetermined range, on the basis of the location information.

3. The communication system as set forth in claim 1, wherein the HLR sets the search period value to "0" if the HLR determines that the HPLMN and PLMN do not exist in a predetermined range, on the basis of the location information.

4. The communication system as set forth in claim 2, wherein the HLR newly sets the search period value when newly receiving the location information.

5. The communication system as set forth in claim 4, wherein the location information is geographic information on a map.

6. The communication system as set forth in claim 5, wherein the location information comprises latitude information and longitude information associated with the location of the MS.

7. The communication system as set forth in claim 1, wherein the subscriber data is information associated with corresponding service subscription using the MS.

8. The communication system as set forth in claim 1, wherein the HLR transmits the period value to the MS using an OTA (Over The Air) method.

9. A method for selecting a PLMN (Public Land Mobile Network) in an MS (Mobile Station) using a communication system, the communication system including the MS, an MSC (Mobile Switching Center), a VLR (Visitor Location Register) and an HLR (Home Location Register), comprising the steps of:
a) transmitting subscriber identification information and authentication information for authenticating the MS according to a location update request signal containing location information of the MS received from the MS;
b) if the location information is received from the MSC through an authentication procedure by the MSC, updating the location information and allowing the MS to request a previous VLR of the MS to release previously registered location information;
c) if the location information previously registered by the previous VLR is released, inserting subscriber data for the MS into the VLR; and
d) variably setting a search period value for determining a time at which to begin a search at a time of searching for an HPLMN or higher-priority PLMN on the basis of the location information of the MS and transmitting the set search period value to the MS.

10. The method as set forth in claim 9, wherein step d) comprises the steps of:
setting the search period value to a value larger than a set threshold value if it is determined that the HPLMN and PLMN do not exist in a predetermined range, on the basis of the location information; and
setting the search period value to a value smaller than a set threshold value if it is determined that at least one of the HPLMN and PLMN exists in a predetermined range, on the basis of the location information.

11. The method as set forth in claim 9, wherein step d) comprises the step of:
setting the search period value to "0" if it is determined that the HPLMN and PLMN do not exist in a predetermined range, on the basis of the location information.

12. The method as set forth in claim 10, wherein step d) comprises the step of:
newly setting the search period value when the location information is newly received.

13. The method as set forth in claim 12, wherein the location information is geographic information on a map.

14. The method as set forth in claim 13, wherein the location information comprises latitude information and longitude information associated with the location of the MS.

15. The method as set forth in claim 9, wherein the subscriber data is information associated with corresponding service subscription using the MS.

16. The method as set forth in claim 9, wherein step d) comprises the step of:
transmitting the period value to the MS using an OTA (Over The Air) method.

* * * * *